United States Patent
Lu Hill et al.

(10) Patent No.: US 11,049,321 B2
(45) Date of Patent: *Jun. 29, 2021

(54) SENSOR-BASED OBJECT TRACKING AND MONITORING

(71) Applicant: ExtendView Inc., Los Angeles, CA (US)

(72) Inventors: Douglas Lu Hill, Los Angeles, CA (US); Priscilla Lu, Los Angeles, CA (US)

(73) Assignee: Extendview Inc., Los Angeles, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/150,120

(22) Filed: Oct. 2, 2018

(65) Prior Publication Data

US 2019/0102951 A1     Apr. 4, 2019

Related U.S. Application Data

(60) Provisional application No. 62/567,508, filed on Oct. 3, 2017.

(51) Int. Cl.
  *G06T 19/00*  (2011.01)
  *G06T 7/20*  (2017.01)
  *G06T 7/246*  (2017.01)

(52) U.S. Cl.
  CPC .............. *G06T 19/006* (2013.01); *G06T 7/20* (2013.01); *G06T 7/246* (2017.01); *G06T 2207/10016* (2013.01); *G06T 2207/10024* (2013.01); *G06T 2207/30204* (2013.01)

(58) Field of Classification Search
  CPC ......... G06T 19/006; G06T 7/246; G06T 7/20; G06T 2207/10024; G06T 2207/10016; G06T 2207/30204
  See application file for complete search history.

(56) References Cited

U.S. PATENT DOCUMENTS 10,065,074 B1 *  9/2018  Hoang ................... G16H 40/63
10,134,296 B2   11/2018  Anderson
(Continued)

OTHER PUBLICATIONS

Final Office Action, U.S. Appl. No. 16/150,110, dated May 6, 2020, 25 pages.
(Continued)

*Primary Examiner* — Saptarshi Mazumder
(74) *Attorney, Agent, or Firm* — Nicholson De Vos Webster & Elliott LLP (57) ABSTRACT

Techniques are disclosed for capturing and monitoring object motion in an AR environment. One or more sensors deployed to at least one target can be calibrated. Sensor data may be received from the one or more sensors, and the image data can be augmented with a shadow object and a training object to generate augmented image data, the shadow object mirroring the motion of the at least one target. The training object can be caused to perform at least one movement sequence. The motion of the target can be monitored based on the sensor data, and compared to the at least one movement sequence. Based on the comparison, at least one sensor can be caused to provide feedback to the target through the at least one sensor.

20 Claims, 8 Drawing Sheets

(56) References Cited

U.S. PATENT DOCUMENTS

| | | | |
|---|---|---|---|
| 2008/0220941 A1* | 9/2008 | Shaw | G06F 19/3481 482/9 |
| 2010/0173276 A1 | 7/2010 | Vasin | |
| 2012/0206577 A1 | 8/2012 | Guckenberger et al. | |
| 2013/0123667 A1 | 5/2013 | Komatireddy et al. | |
| 2014/0188009 A1 | 7/2014 | Lange et al. | |
| 2015/0098143 A1 | 4/2015 | Anderson et al. | |
| 2015/0099252 A1* | 4/2015 | Anderson | G09B 19/003 434/257 |
| 2017/0055851 A1* | 3/2017 | Al-Ali | A61B 5/053 |
| 2018/0242920 A1 | 8/2018 | Hresko et al. | |

OTHER PUBLICATIONS

Non-Final Office Action for U.S. Appl. No. 16/150,110, dated Dec. 27, 2019, 16 pages.
Notice of Allowance for U.S. Appl. No. 16/150,110, dated Oct. 7, 2020, 20 pages.

* cited by examiner

SENSOR-BASED OBJECT TRACKING AND MONITORING

CROSS-REFERENCE TO RELATED APPLICATIONS

This application claims the benefit of U.S. Provisional Application No. 62/567,508, filed Oct. 3, 2017, which is hereby incorporated by reference.

FIELD OF THE INVENTION

The disclosed embodiments relate generally to techniques for augmented reality (AR) guides and more particularly, but not exclusively, to sensor-based object tracking and monitoring in an AR environment.

BACKGROUND

Augmented reality (AR) allows a user's view of the real world to be superimposed with computer generated images (e.g., virtual images) and other augmented information. The augmented information can include visual, auditory, haptic, or other sensory information that is provided to the user as they navigate an AR environment. This allows for additional data linked to real world objects to be displayed or otherwise provided to the user.

SUMMARY

Techniques are disclosed for capturing and monitoring object motion in an AR environment. One or more sensors deployed to at least one target can be calibrated. Sensor data may be received from the one or more sensors, and the image data can be augmented with a shadow object and a training object to generate augmented image data, the shadow object mirroring the motion of the at least one target. The training object can be caused to perform at least one movement sequence. The motion of the target can be monitored based on the sensor data, and compared to the at least one movement sequence. Based on the comparison, at least one sensor can be caused to provide feedback to the target through the at least one sensor.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

As used herein, the following terms may be used according to the following definitions:

Screen View: The view shown to a user on an augmented reality (AR) display device.

Camera View: A front view of the user, with camera facing the user.

Eye View: A view that approximates the user's view as seen from his/her own eyes.

Mirror View: Any view of the user which represents a view of the user as if viewed in a mirror.

Shadow View Object: A wireframe or simplified view of a target being captured in image data, such as a user, which emulates the actions of the target in real time.

Tutor Guide: A training object which may be displayed and prompts the user to perform particular actions or movements.

Augmented Object: Any object imposed on the Screen View. The shadow view object is an example of an augmented object.

Movement Sequences: A series of motions which may be performed by the tutor guide or other training object. In some embodiments, the movement sequences may represent physician prescribed physical therapy sessions for specific conditions (tennis elbow, carpel tunnel, frozen shoulder, etc.), exercises (yoga, Pilates, aerobics, etc.), or any other series of motions.

Gaming Sequences: Additional movement sequences associated with each of the movement sequences that help enhance the intensity, and also encourage users to extend the endurance of the specific exercises.

Figure 1:
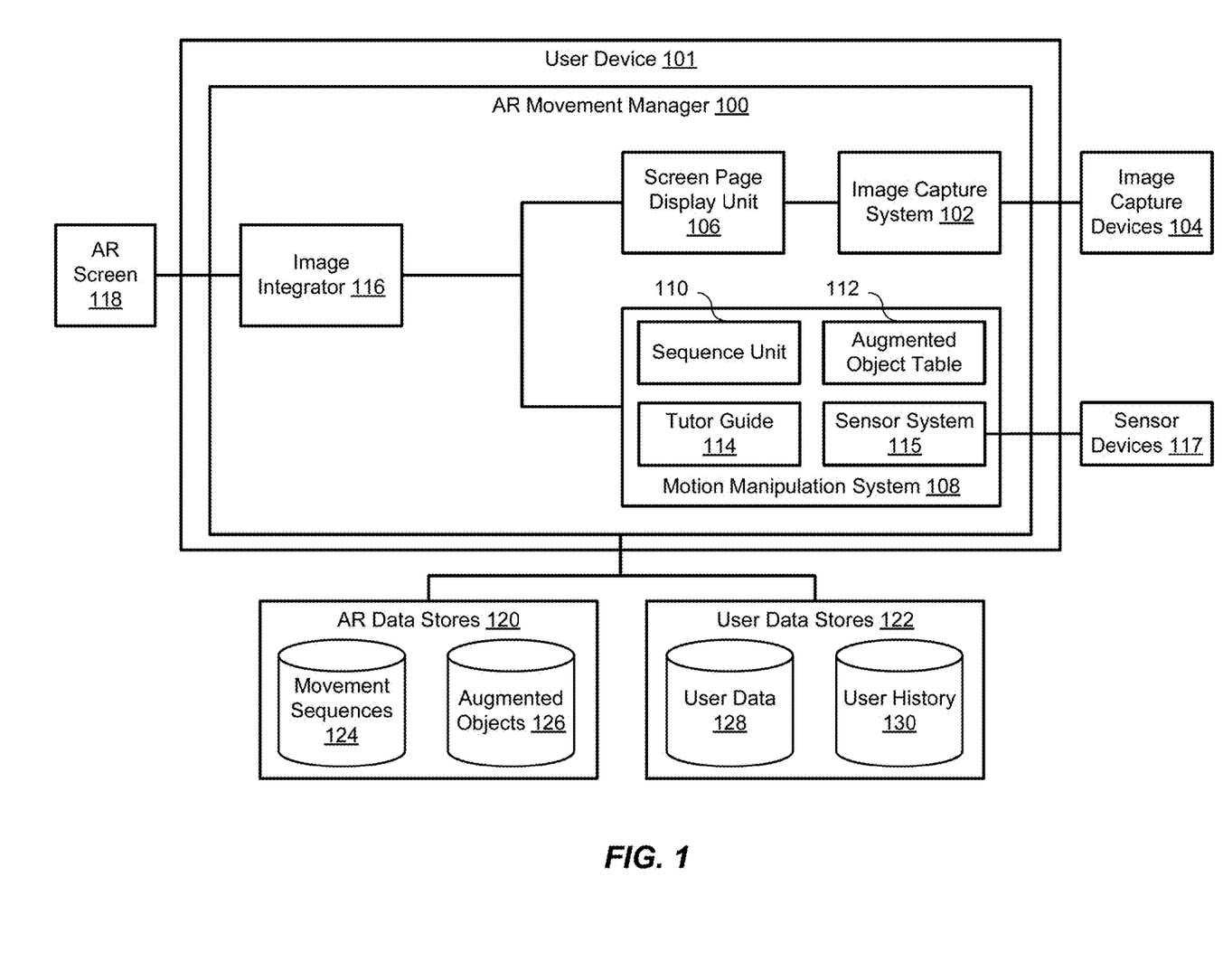
FIG. 1 illustrates an example of a sensor-based object tracking and monitoring system, in accordance with various embodiments of the present invention.

FIG. 1 illustrates an example of a camera-based object tracking and monitoring system 100, in accordance with various embodiments of the present invention. As shown in FIG. 1, a user device 101, such as a smartphone, laptop, desktop, or other computing device may include an augmented reality (AR) movement manager 100. The AR movement manager can include an image capture system 102 which may capture image data from one or more image capture devices 104 which are directed at or around a target. The image capture devices may be deployed to the target, e.g., attached to the user's head providing an eye-view which approximates what the user sees, and/or deployed in front of (or behind, or at another position relative to) the target, providing a camera view or mirror view of the target. In some embodiments, the camera in front of the target may be placed at a specified distance and height. In some embodiments, the target may be a user, such as a patient being instructed to perform a series of movements. The image data may be analyzed by the image capture system 102 to identify feature points of the target and track the displacement of those feature points in the image data as the target moves.

Alternatively, in some embodiments, sensor devices 117 may be deployed to the target. As discussed further below, the sensor devices 117 may include accelerometers, gyroscopes, or other sensor modules, allowing the sensors to continuously monitor the position, angle, acceleration, etc. of different portions of the target. The sensor devices may provide this movement data in real time to sensor system

115. This movement data may be passed in real time to screen page display (SPD) unit 106. The SPD may generate a page by page image in real time showing the delta difference in motion of the shadow view and any augmented objects imposed on the screen view. Initially, a calibration object may be displayed which instructs the target to perform a series of motions to allow the image capture system to identify feature points of the target. In some embodiments, an image integrator 116 may augment the image data captured by image capture system 102 with the shadow view and other augmented objects, such as the tutor guide. As such, the augmented image data may include a representation of the target as well as the shadow view and/or other augmented objects.

In some embodiments, a motion manipulation system (MMS) can determine the motion of augmented objects based on the defined movement sequence and/or the target's shadow view motions. The MMS may include an augmented object table (AOT) 112 which includes a list of available augmented objects that can be displayed and imposed on the Screen View and displayed by the SPD in real time. The AOT may be extensible by adding additional objects to augmented objects data store 126 and adding entries for the new objects to the AOT. Each entry may include an identifier for the object and a storage location. The MMS may also include a sequence unit (SU) 110 which can create real time response to motion of the shadow view based on the Movement Sequences defined in data store 124. The SU may cause augmented objects, such as the tutor guide 114 to perform more or fewer motions depending on the user's progress, as represented by the motion of the shadow view.

In some embodiments, augmented reality (AR) system 100 may access AR data stores 120 and user data stores 122. User data stores 122 can include user data store 128 which includes confidential data, such as medical history, doctor's comments and record reporting (e.g., name, therapy prescription, exercise regiments, collected history of exercises completed, and levels of accuracy/conditions attained with dates, time, duration, doctor's report and comments, etc.). A screen view data store 130 may include screen views which are dynamically created from screen capture and retained to provide continuous page changes as the augmented object images changes position.

In some embodiments, AR data stores 120 may include a movement sequences data store 124 which may include a series of pre-programmed exercises or other movements associated with each treatment as prescribed by a physician, therapist, instructor, or other entity. The exercise sequences can use a Tutor Guide figure or other augmented object to illustrate the movements in the Sequence Unit's database 124—these form the foundation movements that drives the real-time response of the "Tutor Guide" figure which is illustrated by the Tutor figure shown in the Augmented Reality screen which the User is instructed to follow. As discussed, the AR data stores may also include an augmented object data store which includes augmented objects that can be selected by the users to help guide its movements. In some embodiments, the user's shadow view object may be stored in the augmented objects data store after it is created during calibration. Calibration may be used to determine proportional height, length of limbs and angle positions based on various alignment parameters.

As discussed above, the image capture system can capture motion of the shadow view object, by identifying the movement of the target in the sensor data. Calculation of this movement data may be performed in real time. This real-time movement data may be passed to the SPD. The SPD integrates information from capture system that captures the real-time motion of the user which then drives the change in positions of the shadow view shown AR screen 118. In some embodiments, additional augmented objects may be displayed which respond to the motion of the user and based on the defined movement sequences in AR data stores 120. The Motion Manipulation System (MMS) uses the information in the Sequences Unit (SU) to respond in real time to the motion of the user guided by the prescription prompts from the Tutor Guides which shows where and how the movement should be done by the User based on the prescribed exercises included in physical therapy data store 124.

At startup, the user can perform an initial calibration. This calibration phase ensures that the motion of users of different sizes is correctly identified by the system. Sensor data from a plurality of sensors positioned at different locations on that target may be recorded and analyzed to determine height, limbs and plumb-line (e.g., vertical angle) of the user. In some embodiments, during calibration portions of the user's body can be identified using a representation of the user shown in image data captured of the user performing a calibration movement sequence. For example, each portion of the body (e.g., each limb, torso, neck, head, etc.) represented in the images can be labeled with a tag. In some embodiments, the tag may include a color, with different colors assigned to each portion of the user's body. The tags may be applied to the image data by the system using a machine learning image analysis system or service implementing, e.g., object detection and/or segmentation techniques. In some embodiments, the tags may be manually applied to the image data by a user (either the current user, an instructor, doctor, therapist, or other user). For example, a user may outline different portions of the image data which show different portions of the user's body and assign a color to that portion. Once each portion of the user's body has been tagged, image processing techniques may be used to estimate the size of each portion, the users, height, plumb-line, etc. The shadow view object may be rendered based on this calibration set. Once calibration is complete, the user may then select a movement sequence based on duration, intensity, etc. A tutor guide and/or other augmented objects may be displayed in the image data allowing the user to perform the movements while observing any differential that exists between the user's motions and the prescribed motions.

Embodiments described herein may be implemented using a variety of computing systems as discussed further below. For example, AR screen 118 may include a head mounted display (HMD) providing stereoscopic views to the user, a projection system including one or more projectors to display AR and VR images on one or more display surface, or other display device. Although functional components are shown and described separately, this is for simplicity of explanation only. In various embodiments, AR movement manager 100 may be integrated into AR screen 118 (e.g., where an HMD includes computing resources to perform the AR processing described above). In some embodiments, AR screen 118 may represent a thin client device that is connected to AR movement manager 100 over one or more networks (e.g., an Ethernet network, a wireless network operating using an IEEE 802.11 suite of protocols, a mobile network, etc.). Similarly, AR and user data stores 120, 122 may be implemented as local data stores to AR screen 118 and/or AR movement manager 100, or may be accessible over one or more networks. AR movement manager 100 may be implemented on various computing systems such as a video game console, desktop, laptop, workstation, or other computing device. In some embodiments, AR movement manager 100 may be implemented in a cloud computing system including various remote computing resources that may be increased or decreased dynamically based on processing or other resource requirements.

Figure 2:
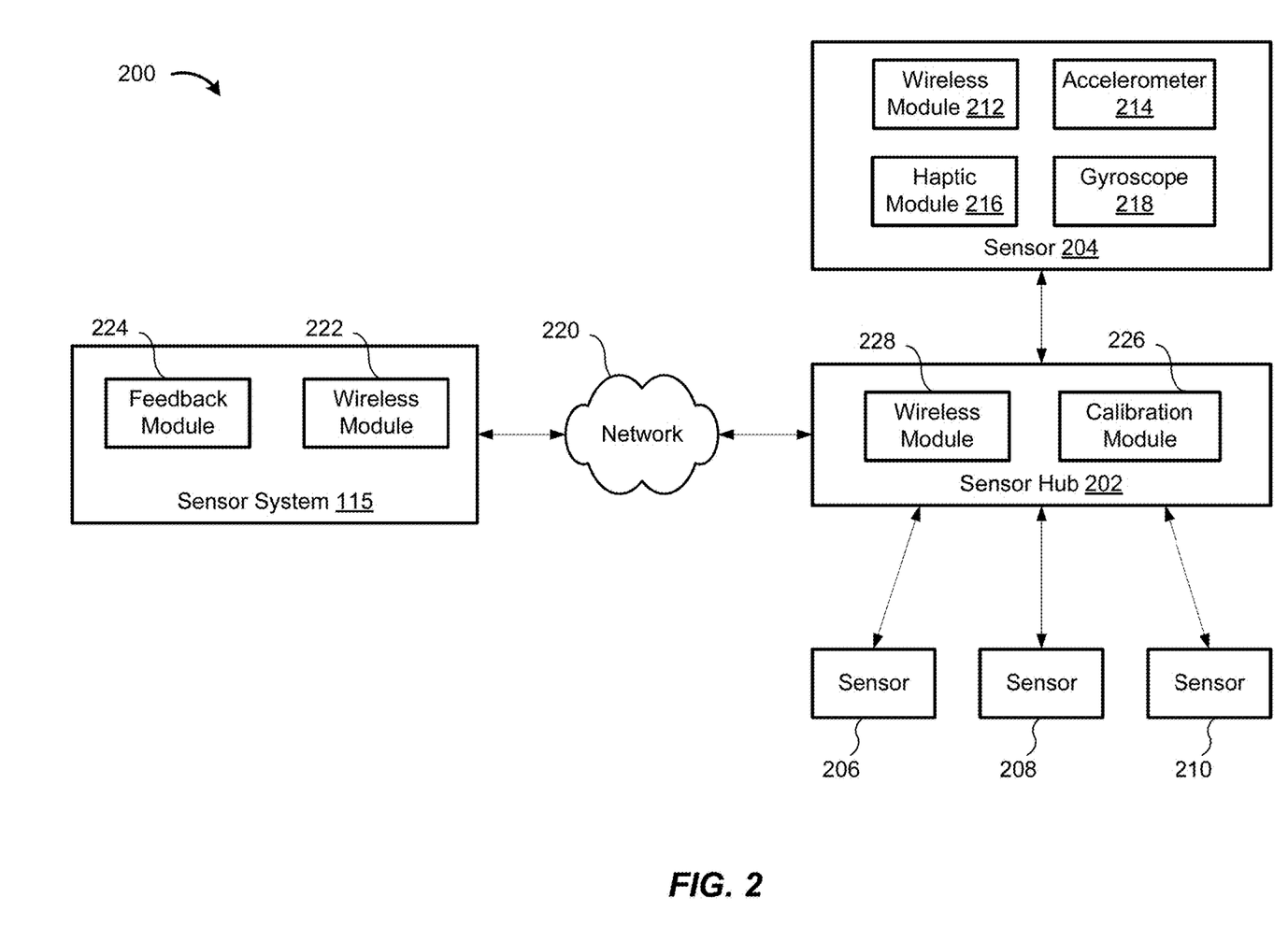
FIG. 2 illustrates an example of a sensor system, in accordance with various embodiments.

FIG. 2 illustrates an example 200 of a sensor system, in accordance with various embodiments. A sensor hub 202 can be deployed to a target (e.g., for a human target hung around the neck). The sensor hub can communicate with a plurality of sensors 204-210 that are also deployed to the target and located at various locations on the target. As shown in sensor 204, a sensor may include a wireless module for communicating with sensor hub 202, an accelerometer 214 for measuring the acceleration of the sensor and therefore the acceleration of the portion of the target to which the sensor is deployed, a haptic module 216, and a gyroscopic sensor 218 to determine positions and orientation. With these modules, each sensor can determine the acceleration, angle of incline, and height from the ground or other reference plane (e.g., in the case where the body or limbs are lifted off the ground or other surface; like sit ups or squats). The haptic module can provide feedback to the user to indicate that a sensor is out of alignment with the prescribed motion.

Each sensor can transmit continuously or at regular intervals, to the sensor hub 202. The sensor hub may include a calibration module, which it can use to connect to each sensor and determine where the sensor is located. For example, by determining the height from the ground and angle of incline of the sensor while at rest. Wireless module 228 enables the hub to communicate with each sensor and with sensor system 115 over network 220. Sensor system 115 can include a wireless module 222 and a feedback module 224. Feedback module 224 can instruct sensor hub to cause a particular sensor to provide feedback to the user, based on the location of the sensors relative to the prescribed motions.

Figure 3:
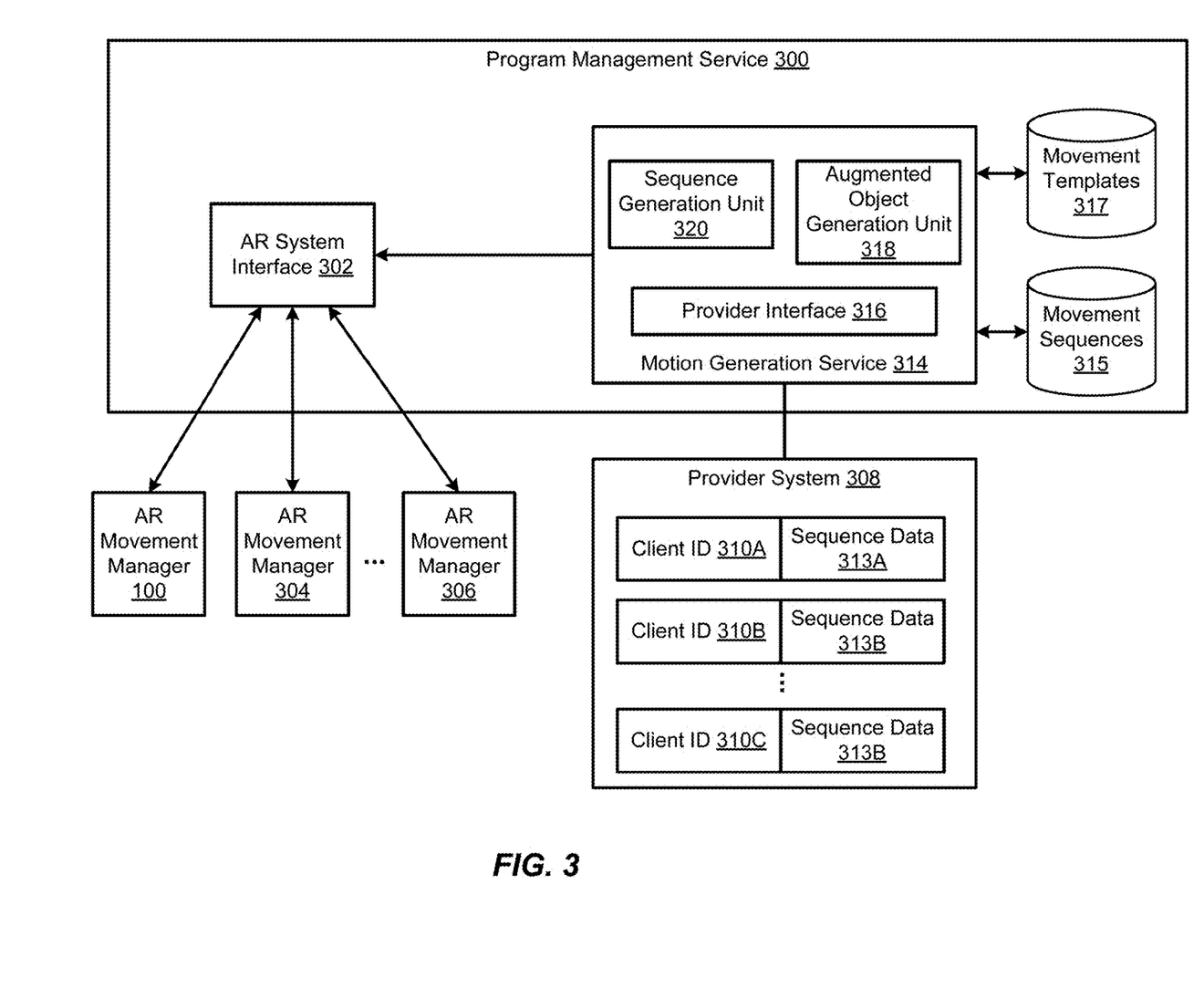
FIG. 3 illustrates an example of a program management service, in accordance with various embodiments of the present invention.

FIG. 3 illustrates an example of a program management service, in accordance with various embodiments of the present invention. As shown in FIG. 3, a program management service 300 can coordinate distribution of movement sequences (e.g., physical therapy, exercise instructions, etc.) from a provider system 308 to various connected AR movement managers 100, 304, 306. The program management service 300 can include an AR system interface 302, through which each AR movement manager can obtain new movement sequences, update existing movement sequences, or request new or different movement sequences.

In some embodiments, AR system interface 302 can provide access to movement sequences through each user device. Although the user interface is shown as part of program management service 300, each AR movement manager may provide the user interface as a graphical user interface or other user interface. The user can select from movement sequences that have been assigned to them or may search for available movement sequences to be performed. When a movement sequence is selected, the requirements of the movement sequence can be displayed. In some embodiments, a prelaunch phase can include an example of the movement sequence, such as a video demonstration, virtual demonstration, or other example of the movement. The user can then position the user device such that the user's motions are visible to the image capture device and perform calibration of the shadow view. Characteristics of the user's motion (e.g., speed, angle, repetitions, etc.) can be determined by the AR movement manager and those characteristics can be compared to an ideal form represented by the tutor guide or other augmented object. Any discrepancies in the user's movements (e.g., faster or slower than assigned, misaligned angle of movement, etc.) can be shown to the user as part of a performance history.

A provider system 308 may provide movement sequences to a plurality of different users using a plurality of different AR movement managers. For example, a doctor using provider system 308 may provide physical therapy sequences to patients using AR movement managers 100, 304, and 306. In some embodiments, the provider system can provide movement data which may include a client ID 310A-310C and corresponding sequence data 312A-312C. Each client ID may correspond to a different user and each sequence data may characterize the movements to be performed by an augmented object, such as the tutor guide.

In some embodiments, program management service 300 can include a motion generation service 314. Motion generation service 314 can receive movement data from various provider systems 308 and generate augmented objects and movement sequences based on the movement data. The movement data may be received through a provider interface 316, which may be an application programming interface, web interface, or other interface. In some embodiments, provider system 308 may execute an application implementing a software development kit (SDK) provided by program management service 300. The sequence data 312 may describe one or more movement sequences (e.g., exercises, therapeutic movements, etc.). For example, the movement sequences may define movement over time for a plurality of spatial points of an object. Augmented object generation unit 318 can generate a visualization of the plurality of spatial points and their movement over time in the form of an augmented object. For example, image or video data of an avatar, such as tutor guide 114 or other augmented object. In some embodiments, a user of an AR movement manager may request a new augmented object be generated for a given movement sequence. The augmented object generation unit 318 can generate the new augmented object and provide it to the AR movement manager via AR system interface 302.

In some embodiments, provider interface 316 may include a web portal enables through which providers may access the program management service 300, e.g., using a username and password, or other login credentials. The provider can identify a particular user to assign one or more movement sequences to, or may make one or more movement sequences available to any user accessing the service 300. When selecting a particular user, the provider can view a user dashboard, which may indicate the user's performance in previously assigned movements as well as a history of successfully completed movements. A provider can select new movement sequences from various predefined movement sequences 315 or may create new movement sequences through the provider interface 314 using one or more movement templates 317. For example, each template may correspond to a movement of a different portion of a target (e.g., a user's arm, leg, neck, etc.). The provider can define a new movement sequence by setting a required repetition, frequency, duration, range of motion, etc. for each movement in the movement sequence. Once defined, the provider can save the movement sequence to movement sequence data store 315 and assign it to the user's schedule.

In some embodiments, the sequence data 312 received from a provider system 308 may include high resolution movement data (e.g., including movement data of having a high sampling rate and/or representing the motion of a high density of spatial points). However, given variation in the processing capabilities of a user device implementing an AR movement manager (e.g., ranging from a smart phone, to a video games console, to high performance consumer electronics), every system may not be capable of effectively rendering such movements. Accordingly, a sequence generation unit 320 can convert the sequence data 312 into a format appropriate for the AR movement manager receiving the movement sequence (e.g., to be stored in movement sequences database 124). For example, sequence generation unit 320 may downsample the sequence data prior to providing it to an AR movement manager. Additionally, or alternatively, sequence generation unit 320 may provide compression services to the sequence data to more effectively transmit the sequence data over one or more network connections to a given AR movement manager.

In some embodiments, sequence generation unit 320 may generate sequence data from image movement data. For example, the movement data provided by a provider system 308 may include image data (e.g., still image data, video data, etc.) which includes a representation of an object performing a series of movements. The image data may be analyzed to determine movement characteristics, such as speed, angle, direction, etc. of the movements. In some embodiments, the image data may be associated with metadata describing, e.g., a distance from the camera to the object, object size, camera data to convert from an image coordinate system to a world coordinate system, etc. This data may be used to construct a three-dimensional representation of the object shown in the image data. Spatial points and their corresponding movements over time may then be determined from the 3D representation and provided to the AR movement managers as sequence data and/or used by augmented object generation unit 318 to generate an augmented object to be used by the AR movement managers to demonstrate the object's movement to a user.

Figure 4:
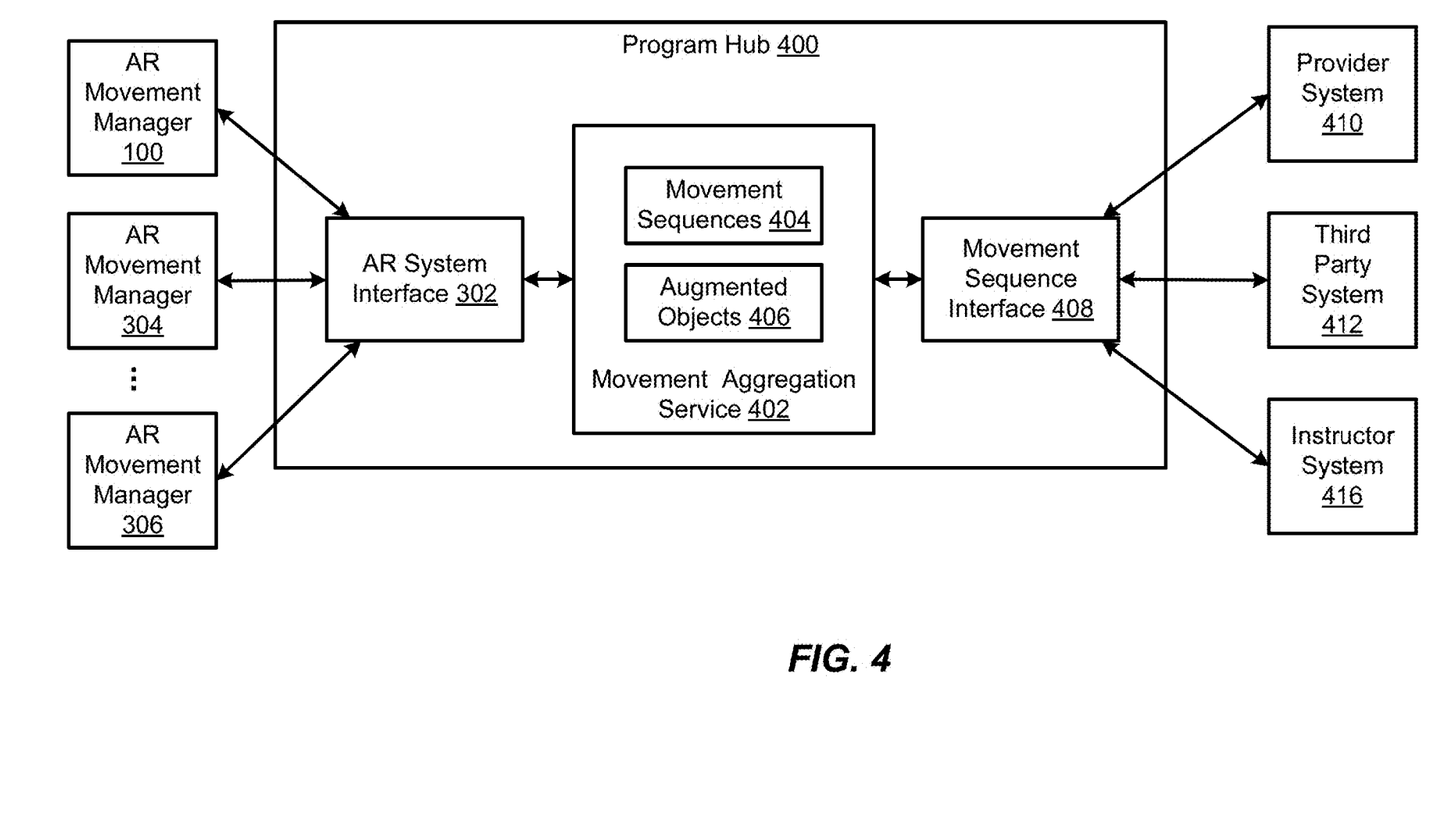
FIG. 4 illustrates an example of a program hub, in accordance with various embodiments of the present invention.

FIG. 4 illustrates an example of a program hub, in accordance with various embodiments of the present invention. As shown in FIG. 4, a program hub 400 may provide a centralized repository for various movement sequences obtained from various providers. For example, movement aggregation service 402 may include movement sequences 404 and augmented objects 406 received from a plurality of sources, such as provider systems 410 (e.g., including doctor-defined exercise regimens), third party systems 412 (e.g., commercial exercise providers, video game systems, etc.), and instructor systems 414 (e.g., including movements designed by various exercise instructors, such as yoga instructors, Pilates instructors, aerobics instructors, and/or other physical activity instructors). In some embodiments, each source may provide their movement sequences to be aggregated through movement sequence interface 408. Movement sequence interface 408 may include a web interface through which a provider or other source can upload their movement sequence. Each movement sequence can be associated with a description of the movement sequence (e.g., type of movement, exercise goals, treatment strategies, etc.).

These movements may then be aggregated by movement aggregation service 402. In some embodiments, movement aggregation service 402 can index each movement by its source and/or description (or keywords derived from the description). A user of an AR movement manager may then access the movement aggregation service 402 through an interface, such as AR system interface 302 or a different interface specific to the program hub 400. The interface may also be a web interface through which the user can search for a desired movement sequence (e.g., by provider, type of movement, etc.) and then download the movement sequence and/or augmented objects to their AR movement manager. This way, program hub 400 acts as a centralized distribution system through which new movements can be added by movement providers and obtained for use by various AR movement managers. In some embodiments, program hub 400, and the functionality described above may be incorporated into program management service 300.

Figure 5:
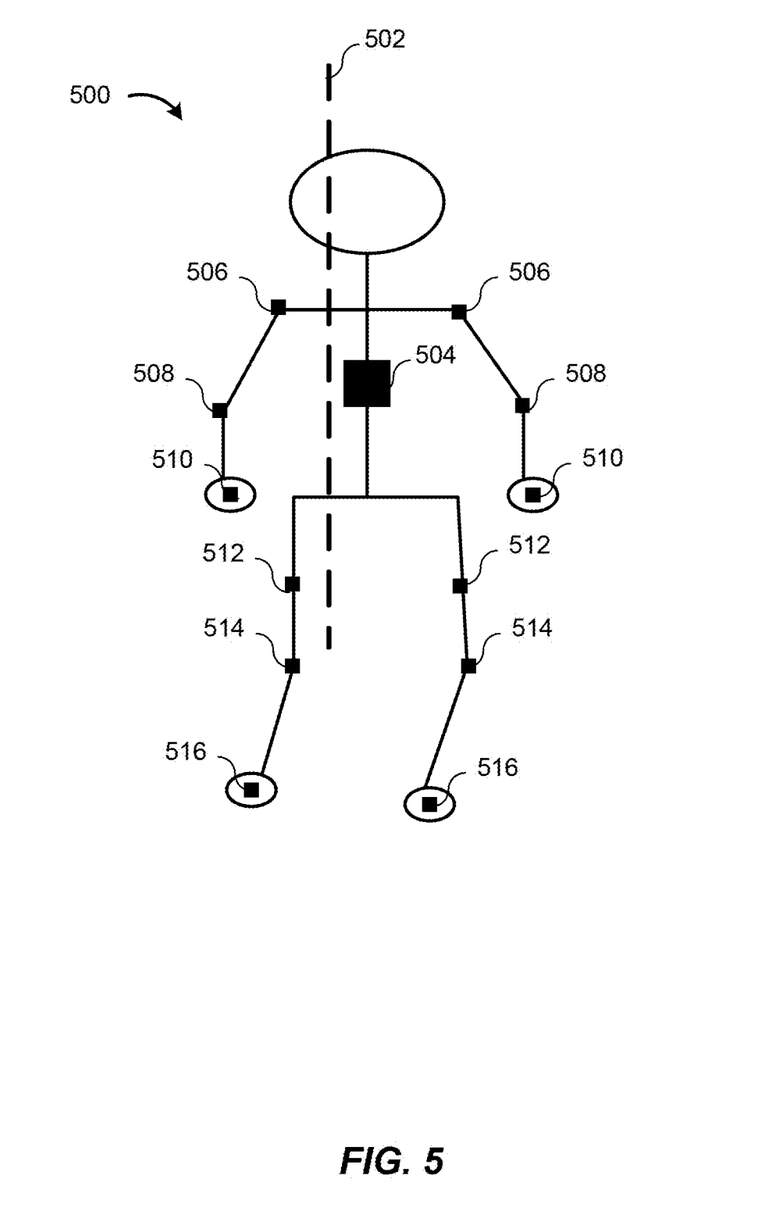
FIG. 5 illustrates an example of a shadow object corresponding to a camera-tracked target, in accordance with various embodiments.

FIG. 5 illustrates an example of a shadow object corresponding to a sensor-tracked target, in accordance with various embodiments. As shown in FIG. 5, a shadow view object 500 may be constructed based on the motion and dimensions of a target and displayed in an augmented reality display device. In some embodiments, feature points of the target may be determined using computer vision and image processing techniques. For example, a plumb line 502 may be using a sensor hub 504 which may be worn by the target. The sensor hub may include accelerometers, gyroscopes, and/or other sensors enabling it to determine the target's plumb line. In some embodiments, sensors 506-316 may be worn by the target, with each sensor collecting position, speed, acceleration, angle, etc. of the target at each location. Each sensor may provide sensor data to sensor hub 504 which may then pass the sensor data to the AR system 100. In some embodiments, each sensor may include one or more feedback mechanisms, enabling feedback to be provided to the user when a sensor is misaligned with a given movement. In some embodiments, feedback may be provided haptically or audibly.

In some embodiments, a training object may be displayed performing different motions. The training object may be similar in shape to the target. For example, the dimensions of the target may be used to construct a similarly sized and proportioned wireframe model. The speed and complexity of the motions performed by the training object may increase based on time (e.g., every X minutes, or Y repetitions, the speed and complexity increase) and/or based on the monitored motion of the target. For example, speed and complexity may continuously increase while the target matches the motion of the training object and may slow as the motion fails to track the training object. The training object and shadow view object 500 may each be displayed as a camera view or eye view, as discussed above.

In various embodiments, one or more sensors may remain attached to a target outside of any session (e.g., worn by the patient outside of a physical therapy session). Each sensor may record the movement of the target and provide feedback based on prior data collected about the movement of the target. As discussed, this feedback may include haptic feedback provided by a sensor which detects movement that is out of alignment, audible feedback, or any other sensory feedback detectable by the target. In some embodiments, each sensor may wirelessly upload the data to the sensor system through a wireless interface over one or more networks (e.g., a WiFi network, mobile network, or other wireless network). In some embodiments, the sensor hub may record and store movement data from each sensor collected outside of a session. This data may then be downloaded from the sensor hub at the next session, or periodically over a wireless network.

In some embodiments, the sensors worn outside of a session may be used to establish a baseline, or "normal," movement pattern or history of the target. In some embodiments, the sensors may receive movement pattern data based on the target's movement at a recent session. For example, one or more motions may be prescribed to the target to perform between sessions. Movement pattern data indicative of the prescribed motions (e.g., angle, position, speed, acceleration, etc.) for each sensor may be provided to the sensors (e.g., uploaded during a session). Outside of the session, the sensors may continue monitoring the target's movement and comparing those movements to the prescribed patterns and providing feedback. In some embodiments, the prescribed motions may include a plurality of progressively more difficult patterns. Based on the feedback, the sensors may automatically begin comparing the target's movements to a next pattern in the progression. For example, if the sensors determine that the number of movement errors detected is below a threshold value during a predefined period of time, the sensors may begin comparing the target's movements to the next pattern. Similarly, if the sensors determine that the number of movement errors detected is above a threshold value, the sensors may begin comparing the target's movements to a previous, or less difficult, pattern. As discussed, in some embodiments, the sensors may continuously or periodically upload movement data for the target outside of a session. Based on the uploaded movement data, new movement patterns may be pushed to the sensors (either directly or through the sensor hub) to be used for comparing the target's movement between sessions.

Figure 6:
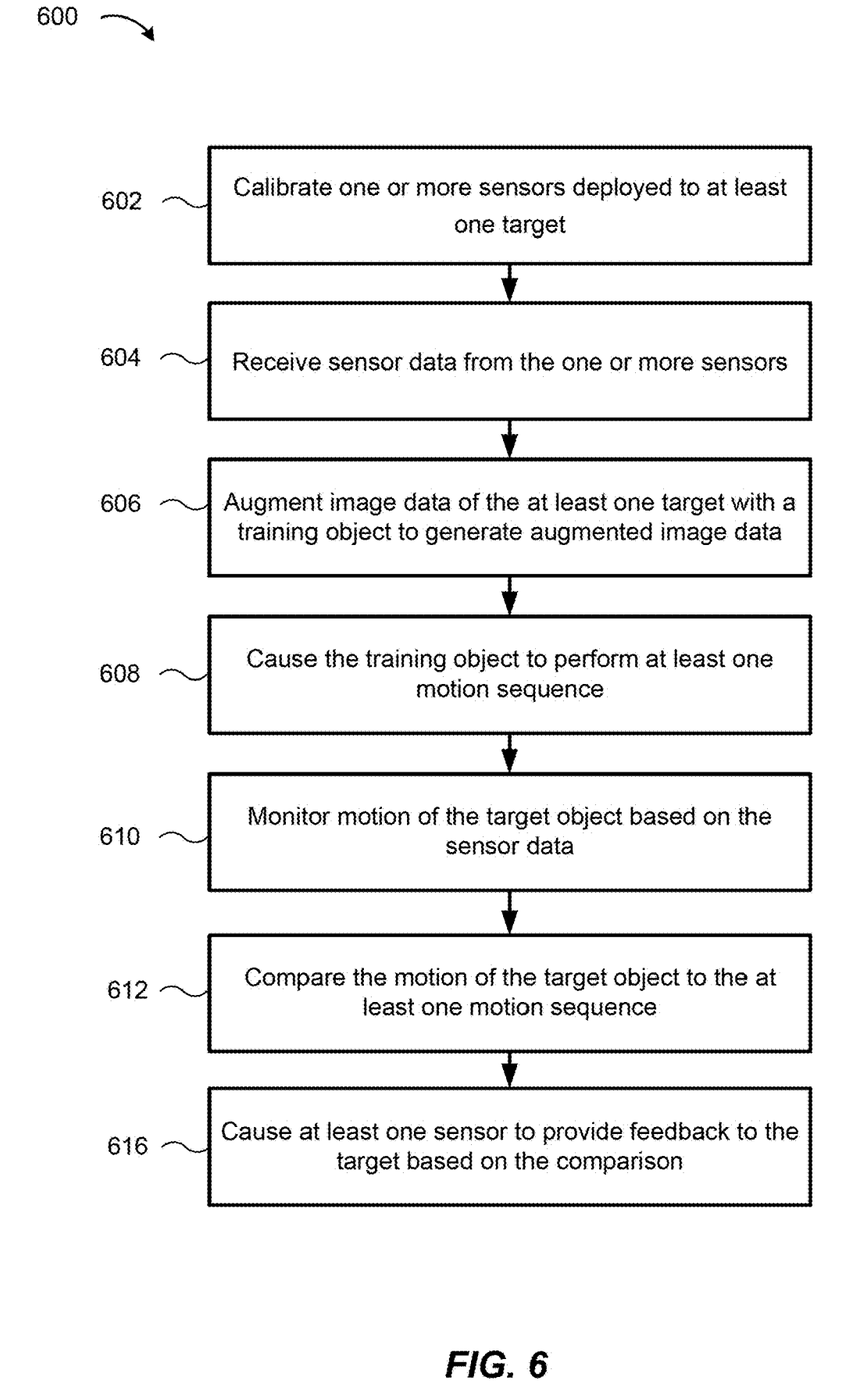
FIG. 6 illustrates an example method, in accordance with various embodiments.

FIG. 6 shows a method 600 of object tracking in an augmented reality environment, in accordance with various embodiments. The method may include, at 602, calibrating one or more sensors deployed to at least one target. The sensors may be incorporated into sleeves, bracelets, or other wearable devices. The one or more sensors include a sensor hub and a plurality of sensors positioned at different locations on the at least one target, each of the plurality of sensors to determine acceleration, angle of incline, and height from the ground of at least a portion of the at least one target.

The method may further include, at 604, receiving sensor data from the one or more sensors. In some embodiments, receiving the sensor data may include receiving the sensor data from the sensor hub, the sensor data including the acceleration, angle of incline, and height from the ground of at least a portion of the at least one target determined from each of the plurality of sensors and communicated from each of the plurality of sensors to the sensor hub.

The method may further include, at 606, augmenting the image data with a shadow object and a training object to generate augmented image data, the shadow object mirroring the motion of the at least one target. As discussed, the shadow object may be a wireframe representation or other simplified representation of the target which moves to mimic the motion of the target.

The method may further include, at 608, causing the training object to perform at least one movement sequence. In some embodiments, the at least one movement sequence includes a motion for at least a portion of the at least one target, the portion of the at least one object having at least one of the one or more sensors positioned thereon. The method may further include, at 610, monitoring the motion of the target based on the sensor data. The method may further include, at 612, comparing the motion of the target to the at least one movement sequence. The method may further include, at 614, causing at least one sensor to provide feedback to the target based on the comparison. As discussed, a sensor corresponding to a portion of the target that is not aligned with the movement sequence may provide haptic and/or audible feedback.

In some embodiments, the method may further include collecting performance metrics based at least on the sensor data received from the one or more sensors, the performance metrics including one or more of time to complete the at least one movement sequence, performance speed, or performance accuracy relative to the training object, and providing the performance metrics to at least one provider computing device. In some embodiments, the method may further include receiving at least one second movement sequence from the provider computing device, the at least one second movement sequence determined based on the performance metrics.

In some embodiments, the method may further include determining a difference between the motion of the at least one target based on the sensor data and the training object, and causing the training object to perform at least one second movement sequence based at least on the difference.

Figure 7:
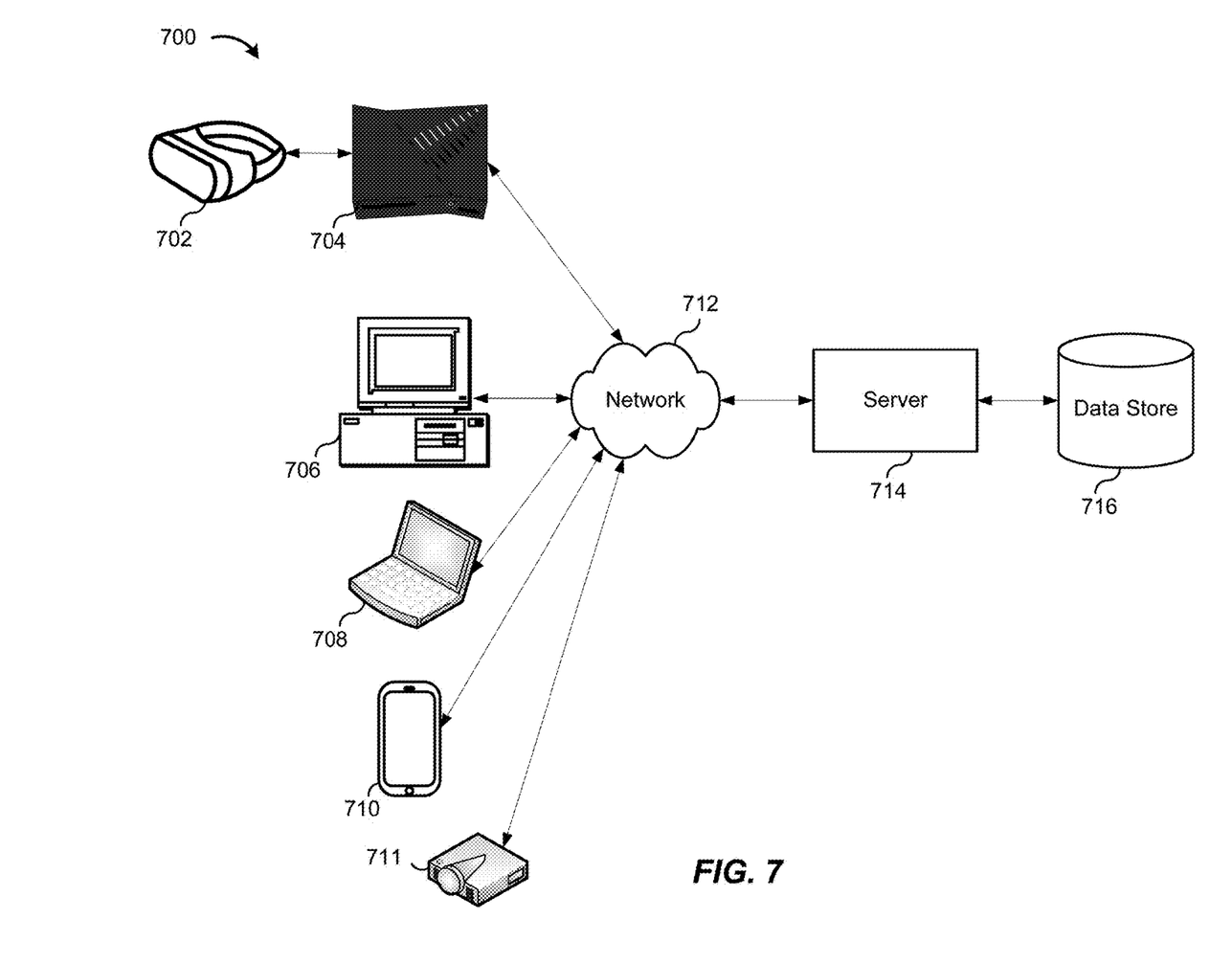
FIG. 7 illustrates an example of a networked system environment, in accordance with various embodiments.

FIG. 7 illustrates an example of a networked system environment, in accordance with various embodiments. As shown in FIG. 7, system environment 700 may include at least one client device 702-710, each of which may execute an application such as an augmented reality/virtual reality application, web browser, or other application. In various embodiments, client devices 702-710 may communicate with at least one server computer 714 over one or more networks 712.

In some embodiments, the client devices 702-710 may include a general purpose personal computer, such as a desktop, laptop, or other personal or workstation computer running one or more operating systems (e.g., Microsoft Windows, Apple macOS, iOS, Android, Unix or Unix-based OS, or other operating systems), and/or a mobile device, including smartphones, tablet computers, or PDAs. In some embodiments, the client devices may include a VR enabled gaming console or computing device, including a head mounted display (HMD). In some embodiments, the client device may include an HMD with all necessary computing resources integrated therein such that a separate computer or gaming console is not required to drive the HMD. In some embodiments, the client devices may include a projection system which includes one or more projectors to project VR or AR images in a room or on one or more display surfaces. The projection system may be driven by a separate computing system connected locally or through network 712 or may include computing resources integrated therein. Although system environment 700 includes six client devices, any number of network-enabled client devices may be supported. Other devices such as devices with sensors, etc. may interact with server 712.

Client devices 702-710 can communicate with at least one server computer over network 710. Network 712 may be any type of network familiar to those skilled in the art that can support data communications using any of a variety of commercially-available protocols, including such as TCP/IP or other suitable protocols. Network 710 may be a wired or wireless local area network (LAN or WLAN), such as an Ethernet network, a wireless network operating using an IEEE 802.11 suite of protocols, the Bluetooth protocol known in the art, and/or any other wireless protocol); and/or any combination of these and/or other networks. Server computer 714 which may include general purpose computers, specialized server computers, server clusters, or any other appropriate computing device capable of running the services and/or applications discussed herein. Server 714 may run an operating system including any of those discussed above and server applications, including HTTP servers, FTP servers, CGI servers, Java servers, database servers, or other server applications.

Server 714 can communicate with one or more data stores 716 which may be located locally at server 714 or may be located remotely and accessed over one or more networks (not shown) or over a storage-area network (SAN). In some embodiments, data store 716 may include one or more databases, such as relational databases, or a storage service, such as an object data store, block data store, or other cloud or network-based storage service.

Figure 8:
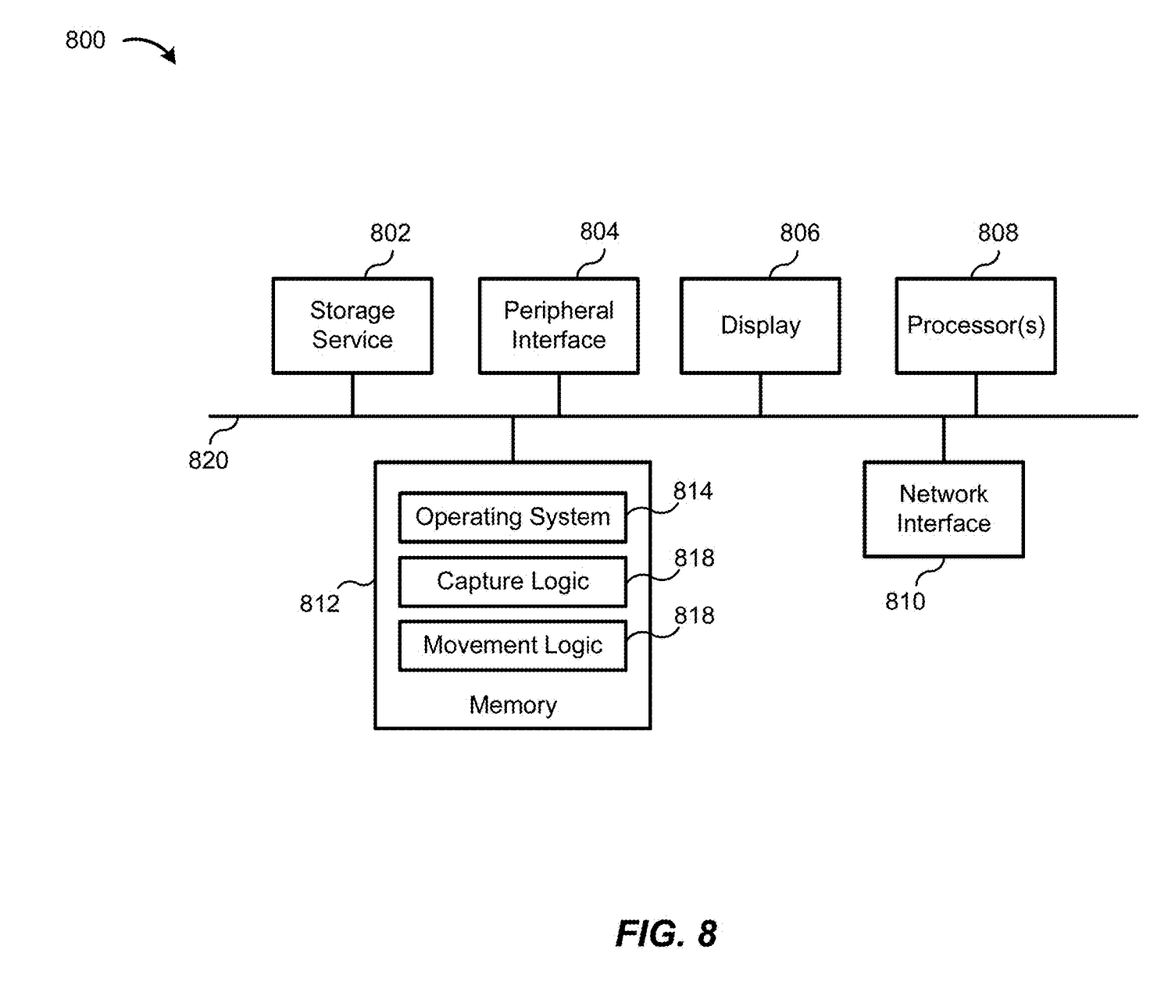
FIG. 8 illustrates an example of a computer system, in accordance with various embodiments of the present invention.

FIG. 8 illustrates an example of a computer system, in accordance with various embodiments of the present invention. For example, the systems discussed herein may be implemented using computer systems such as that shown in FIG. 8. Computer system 800 can include various components coupled via a bus 820. The components may include a storage system or storage system interface 802 which may provide read/write access to one or more non-transitory computer readable storage media. The storage media may be located locally or remotely, and may be accessed directly or through a storage service, such as an object data store, block data store, or other cloud or network-based storage service. The storage media may include devices such as disk drives, optical storage devices, and solid-state storage devices such as a random access memory (RAM) and/or a read-only memory (ROM), which can be programmable, flash-updateable and/or the like.

The computer system may also include a peripheral device interface 804 which can enable the computer system to communicate with input devices (e.g., a mouse, a keyboard, external storage readers, image capture devices, etc.), and an output device interface 806 which may provide output to one or more devices, such as a display device, head mounted display, wearable device or sensor, printers, etc. Processors 808 may include single or multicore CPUs, graphics processing units (GPUs), a digital signal processor (DSP), physics processing units, a special-purpose processor, an application specific integrated circuit (ASIC), application-specific instruction-set processors, field-programmable gate array (FPGA) devices, coprocessors, network processing units, audio processing units, encryption processing units, or other processing device. Computer system 800 may include a network interface 810, which may include one or more of a network card, wireless communication module (e.g., 802.11 compatible wireless module, Bluetooth module, etc.), wired network interface such as an ethernet card, an infra-red communication device, etc.

Computer system 800 may also include memory 812 which may include RAM, ROM, EEPROM, flash memory or other memory technology, CD-ROM, digital versatile disk (DVD) or other optical storage, magnetic storage devices, or any other storage medium. Memory 812 may include software, such as operating system code 814, application programs such as a client application, Web browser, RDBMS, etc. Memory 812 may also include applications as discussed herein, such as image capture logic 816 and motion tracking logic 818.

Embodiments discussed herein can be implemented in hardware, software, firmware, or combinations thereof. Consequently, features of the present invention may be implemented using a processing system (e.g., including one or more processors). As discussed, embodiments may be implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. A method, comprising:
initiating a first session with at least one target;
calibrating one or more sensors deployed to the at least one target, wherein the one or more sensors include a sensor hub and a plurality of sensors positioned at different locations on the at least one target, the sensor hub to determine a plumb-line of the at least one target and to collect sensor data from the plurality of sensors;
receiving the sensor data from the sensor hub;
augmenting image data of the at least one target with a shadow object and a training object to generate augmented image data, the shadow object mirroring a motion of the at least one target;
causing the training object to perform at least one movement sequence, wherein the at least one movement sequence is part of a movement progression which comprises a plurality of movement sequences of varying difficulty levels;
monitoring the motion of the at least one target based on the sensor data;
comparing the motion of the at least one target to the at least one movement sequence;
causing at least one sensor to provide feedback to the at least one target based on the comparison;
determining a difference between the motion of the at least one target based on the sensor data and the training object based on the comparison;
causing the training object to perform at least one second movement sequence having a different range of motion from the at least one movement sequence based at least on the difference;
ending the first session with the at least one target;
collecting post-session sensor data from the plurality of sensors, the post-session sensor data associated with a third movement sequence from the movement progression;
initiating a second session with the at least one target;
receiving the post-session sensor data from the sensor hub;
determining the post-session sensor data includes a number of movement errors below a threshold value; and
causing the training object to perform at least one fourth movement sequence from the movement progression, the at least one fourth movement sequence associated with a higher difficulty level than the at least one third movement sequence.

2. The method of claim 1, wherein each of the plurality of sensors determines acceleration, angle of incline, and height from a reference plane of at least a portion of the at least one target.

3. The method of claim 2, wherein
the sensor data includes the acceleration, angle of incline, and height from the reference plane of at least a portion of the at least one target determined from each of the plurality of sensors and communicated from each of the plurality of sensors to the sensor hub.

4. The method of claim 1, further comprising:
collecting performance metrics based at least on the sensor data received from the one or more sensors, the performance metrics including one or more of time to complete the at least one movement sequence, performance speed, or performance accuracy relative to the training object; and
providing the performance metrics to at least one provider computing device.

5. The method of claim 4, further comprising:
receiving the at least one second movement sequence from the provider computing device, the at least one second movement sequence determined based on the performance metrics.

6. The method of claim 1, wherein the feedback to the target based on the comparison includes one or more of haptic feedback, audible feedback, or visual feedback from at least one sensor based on the comparison of the motion of the target to the at least one movement sequence.

7. The method of claim 1, wherein the at least one movement sequence includes a motion for at least a portion of the at least one target, the portion of the at least one object having at least one of the one or more sensors positioned thereon.

8. A system, comprising:
at least one processor;
a display device connected to the at least one processor;
one or more sensors deployed to at least one target; and
an augmented reality movement manager including instructions which, when executed by the at least one processor, cause the augmented reality movement manager to:
initiate a first session with the at least one target;
calibrate the one or more sensors, wherein the one or more sensors include a sensor hub and a plurality of sensors positioned at different locations on the at least one target, the sensor hub to determine a plumb-line of the at least one target and to collect sensor data from the plurality of sensors;
receive sensor data from the sensor hub;
augment image data of the at least one target with a shadow object and a training object to generate augmented image data, the shadow object mirroring a motion of the at least one target;
cause the training object to perform at least one movement sequence, wherein the at least one movement sequence is part of a movement progression which comprises a plurality of movement sequences of varying difficulty levels;
monitor the motion of the at least one target based on the sensor data;
compare the motion of the at least one target to the at least one movement sequence;
cause at least one sensor to provide feedback to the at least one target based on the comparison;
determine a difference between the motion of the at least one target based on the sensor data and the training object based on the comparison;
cause the training object to perform at least one second movement sequence having a different range of motion from the at least one movement sequence based at least on the difference
end the first session with the at least one target;
collect post-session sensor data from the plurality of sensors, the post-session sensor data associated with a third movement sequence from the movement progression;
initiate a second session with the at least one target;
receive the post-session sensor data from the sensor hub;
determine the post-session sensor data includes a number of movement errors below a threshold value; and
cause the training object to perform at least one fourth movement sequence from the movement progression, the at least one fourth movement sequence associated with a higher difficulty level than the at least one third movement sequence.

9. The system of claim 8, wherein each of the plurality of sensors determines acceleration, angle of incline, and height from a reference plane of at least a portion of the at least one target.

10. The system of claim 9, wherein
the sensor hub, the sensor data includes the acceleration, angle of incline, and height from the reference plane of at least a portion of the at least one target determined from each of the plurality of sensors and communicated from each of the plurality of sensors to the sensor hub.

11. The system of claim 8, wherein the instructions, when executed, further cause the augmented reality movement manager to:
collect performance metrics based at least on the sensor data received from the one or more sensors, the performance metrics including one or more of time to complete the at least one movement sequence, performance speed, or performance accuracy relative to the training object; and
provide the performance metrics to at least one provider computing device.

12. The system of claim 11, wherein the instructions, when executed, further cause the augmented reality movement manager to:
receive the at least one second movement sequence from the provider computing device, the at least one second movement sequence determined based on the performance metrics.

13. The system of claim 8, wherein the feedback to the target based on the comparison includes one or more of haptic feedback, audible feedback, or visual feedback from at least one sensor based on the comparison of the motion of the target to the at least one movement sequence.

14. The system of claim 8, wherein the at least one movement sequence includes a motion for at least a portion of the at least one target, the portion of the at least one object having at least one of the one or more sensors positioned thereon.

15. A non-transitory computer readable storage medium including instruction stored thereon which, when executed by at least one processor, causes the at least one processor to:
initiate a first session with at least one target;
calibrate one or more sensors deployed to the at least one target, wherein the one or more sensors include a sensor hub and a plurality of sensors positioned at different locations on the at least one target, the sensor hub to determine a plumb-line of the at least one target and to collect sensor data from the plurality of sensors;

receive the sensor data from the sensor hub;

augment image data of the at least one target with a shadow object and a training object to generate augmented image data, the shadow object mirroring a motion of the at least one target;

cause the training object to perform at least one movement sequence, wherein the at least one movement sequence is part of a movement progression which comprises a plurality of movement sequences of varying difficulty levels;

monitor the motion of the at least one target based on the sensor data;

compare the motion of the at least one target to the at least one movement sequence;

cause at least one sensor to provide feedback to the at least one target based on the comparison;

determine a difference between the motion of the at least one target based on the sensor data and the training object based on the comparison;

cause the training object to perform at least one second movement sequence having a different range of motion from the at least one movement sequence based at least on the difference;

end the first session with the at least one target;

collect post-session sensor data from the plurality of sensors, the post-session sensor data associated with a third movement sequence from the movement progression;

initiate a second session with the at least one target;

receive the post-session sensor data from the sensor hub;

determine the post-session sensor data includes a number of movement errors below a threshold value; and cause the training object to perform at least one fourth movement sequence from the movement progression, the at least one fourth movement sequence associated with a higher difficulty level than the at least one third movement sequence.

16. The non-transitory computer readable storage medium of claim 15, wherein each of the plurality of sensors determines acceleration, angle of incline, and height from a reference plane of at least a portion of the at least one target.

17. The non-transitory computer readable storage medium of claim 16, wherein
the sensor data includes the acceleration, angle of incline, and height from the reference plane of at least a portion of the at least one target determined from each of the plurality of sensors and communicated from each of the plurality of sensors to the sensor hub.

18. The non-transitory computer readable storage medium of claim 15, wherein the instructions, when executed, further cause the at least one processor to:
collect performance metrics based at least on the sensor data received from the one or more sensors, the performance metrics including one or more of time to complete the at least one movement sequence, performance speed, or performance accuracy relative to the training object; and
provide the performance metrics to at least one provider computing device.

19. The non-transitory computer readable storage medium of claim 18, wherein the instructions, when executed, further cause the at least one processor to:
receive the at least one second movement sequence from the provider computing device, the at least one second movement sequence determined based on the performance metrics.

20. The non-transitory computer readable storage medium of claim 15, wherein the feedback to the target based on the comparison includes one or more of haptic feedback, audible feedback, or visual feedback from at least one sensor based on the comparison of the motion of the target to the at least one movement sequence.

* * * * *